(12) United States Patent
Mallory et al.

(10) Patent No.: US 9,285,098 B2
(45) Date of Patent: Mar. 15, 2016

(54) LED LUMINAIRE

(71) Applicant: CoreLED Systems, LLC, Livonia, MI (US)

(72) Inventors: Derek Mallory, Plymouth, MI (US); Brian C. Wells, Grosse Pointe Farms, MI (US); Dianna Stadtherr, Novi, MI (US)

(73) Assignee: CoreLed Systems, LLC, Livonia, MI (US)

( * ) Notice: Subject to any disclaimer, the term of this patent is extended or adjusted under 35 U.S.C. 154(b) by 0 days.

(21) Appl. No.: 14/336,352

(22) Filed: Jul. 21, 2014

(65) Prior Publication Data

US 2016/0018077 A1 Jan. 21, 2016

(51) Int. Cl.
*F21K 99/00* (2010.01)
*F21V 5/04* (2006.01)
*F21V 5/00* (2015.01)
*F21Y 105/00* (2006.01)

(52) U.S. Cl.
CPC ... *F21V 5/04* (2013.01); *F21K 9/50* (2013.01); *F21V 5/007* (2013.01); *F21Y 2105/001* (2013.01)

(58) Field of Classification Search
CPC .... F21V 5/007; G02B 27/30; G02B 27/0961; F21S 10/007
USPC ............... 362/227, 237, 249.02, 249.04, 246
See application file for complete search history.

(56) References Cited

U.S. PATENT DOCUMENTS

| | | | | |
|---|---|---|---|---|
| 4,411,490 A | * | 10/1983 | Daniel | 126/648 |
| 5,408,395 A | * | 4/1995 | Schmid et al. | 362/240 |
| 6,046,859 A | * | 4/2000 | Raj | 359/649 |
| 6,273,588 B1 | * | 8/2001 | Arakelian | 362/267 |
| 8,262,252 B2 | * | 9/2012 | Bergman et al. | 362/237 |
| 8,360,608 B2 | * | 1/2013 | Wildner | 362/249.04 |
| 8,845,129 B1 | * | 9/2014 | Holder et al. | 362/245 |
| 2005/0024868 A1 | * | 2/2005 | Nagai et al. | 362/227 |

FOREIGN PATENT DOCUMENTS

| | | |
|---|---|---|
| EP | 2110691 A2 | 10/2009 |
| JP | 2011171086 A | 9/2011 |
| JP | 2012123371 A | 6/2012 |
| KR | 101103908 B1 | 1/2012 |
| KR | 10-1305925 B1 | 9/2013 |

OTHER PUBLICATIONS

International Search Report and Written Opinion dated Oct. 29, 2015, Form PCT/ISA/220, 11 pages.
Patent Abstract for JP 2011-171086, date of publication of application: Sep. 1, 2011, 1 page.
Patent Abstract for KR 10-1305925, date of publication of application: Sep. 9, 2013, 1 page.
Patent Abstract for KR 10-1103908, date of publication of application: Jan. 12, 2012, 1 page.
Patent Abstract for JP 2012-123371, date of publication of application: Jun. 28, 2012, 1 page.

* cited by examiner

*Primary Examiner* — Anabel Ton
(74) *Attorney, Agent, or Firm* — Butzel Long

(57) ABSTRACT

A luminaire having an array of light emitting diodes on a circuit board, and a generally planar lens element adjacent each of the LEDs, wherein each lens element has a plurality of concentric ridges projecting from a surface of the lens member to define Fresnel facets for redirecting light emitted from the corresponding LED, providing more uniform light distribution in a compact configuration.

8 Claims, 5 Drawing Sheets

LED LUMINAIRE

CROSS-REFERENCE TO RELATED APPLICATIONS

Not applicable.

FIELD OF THE DISCLOSURE

This invention relates to the field of lighting and more particularly to LED luminaires.

BACKGROUND OF THE DISCLOSURE

Luminaires comprising light emitting diodes (LED) and lenses or other optical elements have been commercially available. However, there remains a need for LED luminaires that more efficiently and uniformly distribute light from the LEDs. Additionally, it is desirable that such luminaires are more compact such as to facilitate a reduction in the size, weight and cost of housings or fixtures in which the luminaires are used.

SUMMARY OF THE DISCLOSURE

Disclosed is an LED luminaire having an array of light emitting diodes mounted on a circuit board, and a generally planar lens element adjacent each one of the corresponding LEDs, in which each lens elements has a plurality of concentric ridges projecting from the surface of the generally planar lens elements to define Fresnel facets for redirecting light emitted from the corresponding LED.

In certain aspects, the plurality of concentric ridges each define a generally square shape having rounded corners.

In certain aspects, at least one of the ridges has a first or forwardly facing facet that can receive and refract light from the LED outwardly, a second or upwardly facing facet that receives and refracts light internally toward a third or rearwardly facing facet, which reflects the light inwardly.

The ridges are typically less than 0.5 mm high, and the LEDs are generally positioned less than 5 mm from the lens elements, thereby facilitating a very compact luminaire.

DETAILED DESCRIPTION OF ILLUSTRATED EMBODIMENTS

Figure 1:
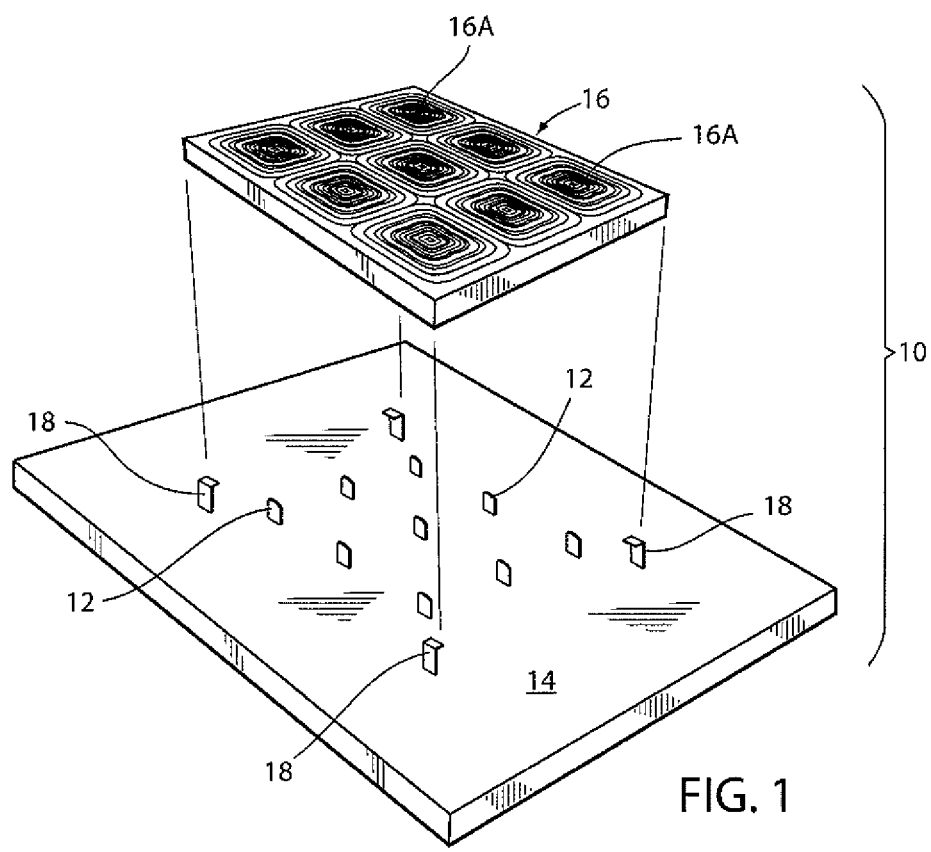
FIG. 1 is a perspective view of a luminaire as disclosed herein.

Shown in FIG. 1 is a luminaire assembly 10 including a plurality of LEDs 12 arranged in an array (e.g., nine LEDs arranged in three rows and three columns) on a circuit board 14. As used herein, the term "array" can refer to any number of rows and columns, and could have equal numbers of LEDs in each row and column or different numbers of LEDs in some rows and columns. The term "circuit board" refers to generally any substrate on which the LEDs can be mounted and which include electrical pathways for powering the LEDs. An example is a printed circuit board. The LEDs in the array are typically equally spaced apart, but could be unequally spaced apart.

A generally planar lens member 16 includes a plurality of integral lens elements 16A arranged in an array, with each lens element 16A corresponding with and aligned with (e.g., centered over) one of the LEDs 12. The lens member 16 can be manufactured with an array of integral lens members using known precision injection molding and embossing transfer techniques. Alternatively, the lens elements could be injection molded individually and combined into an array of elements. The lens elements 16A are aligned with their corresponding LEDs 12 such that a straight line perpendicular to the planar surface of circuit board 14, which passes through the center of an LED 12, also passes through the center of the corresponding lens element 16A. The term "generally planar" refers to the lens member 16 and lens elements 16A having an overall planar structure with opposite substantially flat surfaces interrupted on one side (the side facing LEDs 12) by very low profile light diffracting facets.

Lens member 16 can be properly positioned and spaced from LEDs 12 by spacer elements 18 projecting from the surface of the circuit board. Alternatively, spacers can be integrally formed as part of lens member 16.

Figure 2:
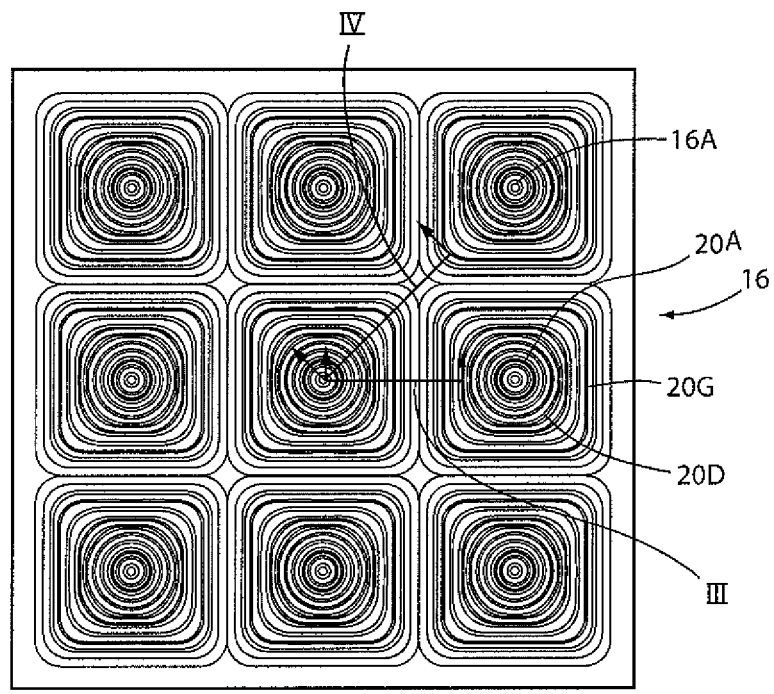
FIG. 2 is a top view of a lens member used in a luminaire as disclosed herein.
Figure 3:
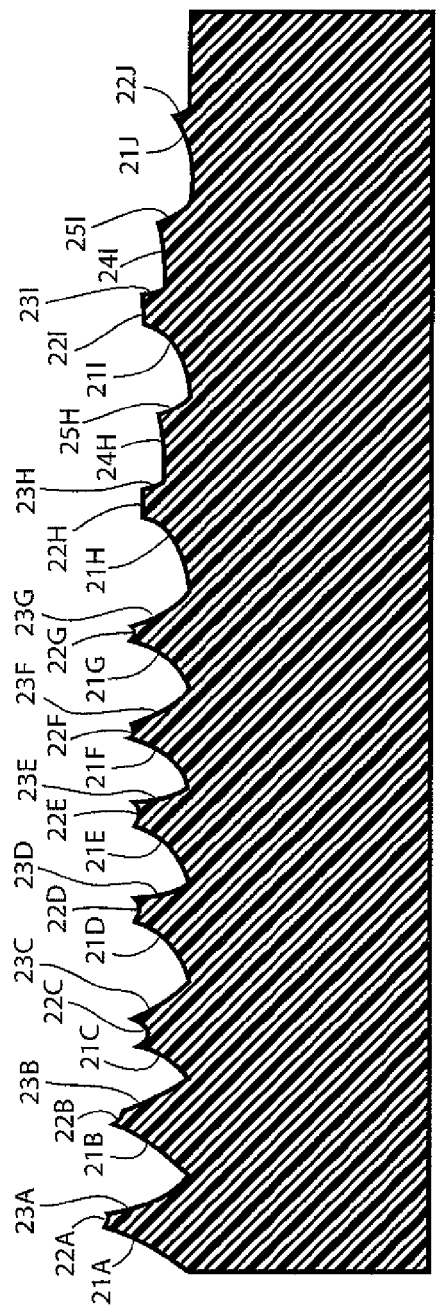
FIG. 3 is a horizontal cross-sectional profile of half of a lens element of the lens member shown in FIG. 2.
Figure 4:
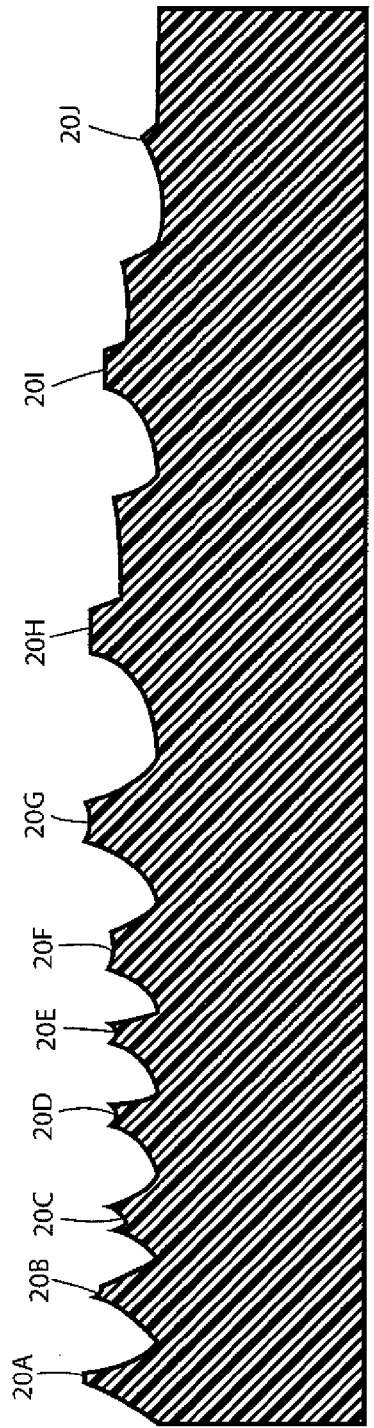
FIG. 4 is a diagonal cross-sectional profile of half of a lens element of the lens member shown in FIG. 2.
Figure 5:
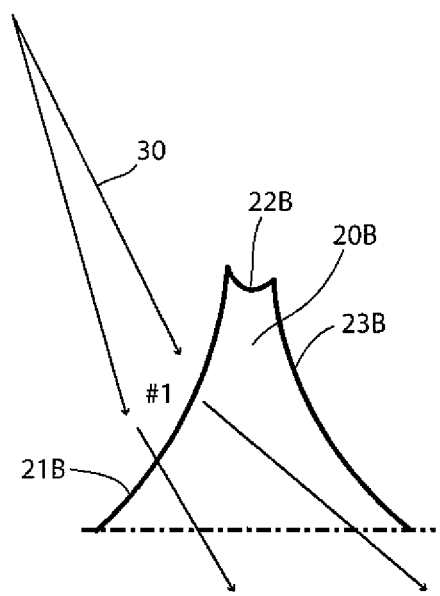
FIG. 5 is a schematic illustration of light impinging on a first Fresnel facet of a ridge on a lens element of the lens member shown in FIG. 2.
Figure 6:
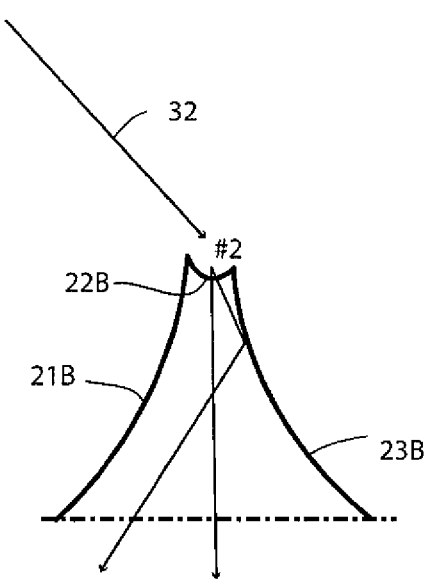
FIG. 6 is a schematic illustration of light impinging on a second Fresnel facet of the ridge shown in FIG. 5.

Each generally planar lens element 16A has a plurality of concentric ridges 20A-20J (FIGS. 2, 3 and 4). The plurality of concentric ridges provide a Fresnel type lens in which a lens having a large aperture and short focal length is provided in a compact lens configuration requiring less mass and volume than a functionally equivalent lens of a more typical or conventional design. The heights of the concentric ridges are typically less than 0.5 mm to facilitate a compact lens design and a compact luminaire assembly, which requires less material, and more compact, lighter weight and less expensive lighting fixtures and housings (e.g., 2 foot by 4 foot troffers). Each of the ridges 20A-20J defines light refracting surfaces or facets 21A, 22A, 23A, 21B, 22B, 23B, 21C, 22C, 23C, 21D, 22D, 23D, 21E, 22E, 23E, 21F, 22F, 23F, 21G, 22G, 23G, 21H, 22H, 23H, 24H, 25H, 21I, 22J, 23I, 24I, 25I, 21J and 22J. The inwardly facing facets 21A, 21B, 21C, 21D, 21E, 21F, 21G, 21H, 21I and 21J diffract light outwardly away from the center of lens element 16A. Generally upwardly facing facets 22A, 22B, 22C, 22D, 22E, 22F, 22G, 22H and 22I diffract light toward outwardly facing facets 23A, 23B, 23C, 23D, 23E, 23F, 23G, 23H and 23I, which through internal reflection redirect light inwardly toward the center of the lens element. This effect is indicated in FIGS. 5 and 6, which show light beam 30 impinging on facet 21B of ridge 20B being directed outwardly away from the center of lens element 16A, and light beam 32 impinging on facet 22B being directed toward facet 23B and reflected inwardly toward the center of lens element 16A.

Figure 7:
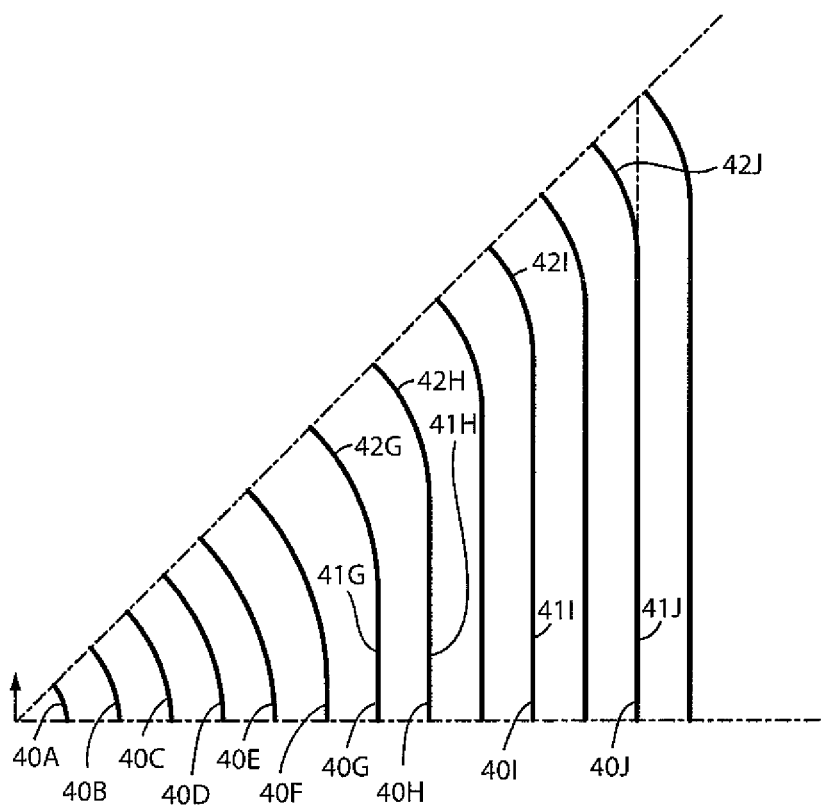
FIG. 7 is a graphical representation of a one-eighth section of the center lines of concentric ridges on a lens element of the lens member shown in FIG. 2.

FIG. 7 provides a graphical illustration of a one-eighth section of the center lines 40A-40J of the illustrated concentric ridges 20A-20J. Each of the remaining seven sections is a mirror image of an adjacent section. Several of the ridges have a generally square shape, with straight sides and rounded corners as defined by straight sections 41G-41J and rounded sections 42G-42J of center lines 40G-40J. Several of the ridges (e.g., ridges 20A-20F) can be continuously curved as indicated by center line 40A-40F.

Generally, all of the facets are concave, with most ridges (e.g., 20A-20I) having an inwardly facing facet 21A-21I and an outwardly facing facet 23A-23I, as well as upwardly facing facets 22A-22I to direct light both outwardly and inwardly toward the center of lens element 16A. Ridge 20J has only inwardly facing facet 21J and outwardly facing facet 22J to direct light only in a generally outward direction.

The lens member 16 on lens elements 16A are positioned in close proximity to the LEDs 12. In particular, the ridges are typically a maximum of about 0.3 mm in height from the planar surface of lens member 16, and the LEDs can be positioned less than 5 mm from the main planar surface of lens member 16, or less than 4 mm, or less than 3 mm. This facilitates a very compact configuration that reduces mass, volume and cost.

Figure 8:
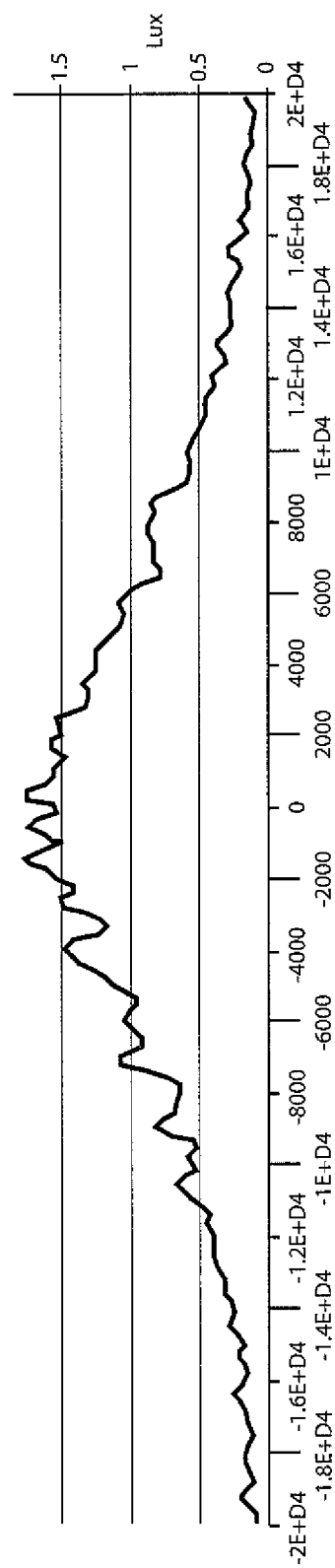
FIG. 8 is a graphical representation of illuminance for a Duris E5 (yellow) LED alone, without a lens, as a function of distance from a center line of the LED.

FIG. 8 shows the illuminance on a surface for a Duris E5 (yellow) LED alone, without a lens, as a function of distance from a center line of the LED. The light is spread over a very wide area, extending radially for about 20 meters.

Figure 9:
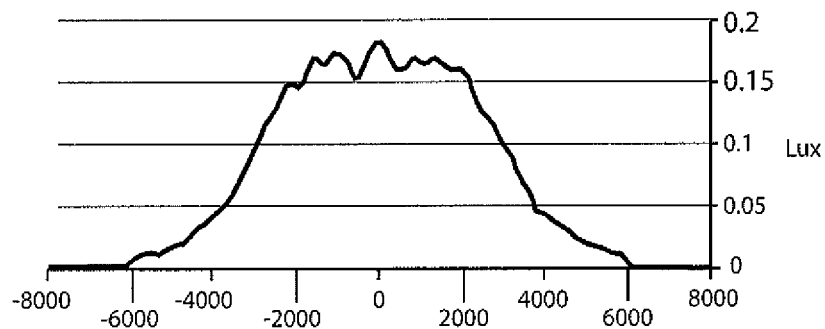
FIG. 9 is a graphical representation of illuminance for the LED of FIG. 8 used with a lens as disclosed herein as a function of distance from the center line of the LED.

FIG. 9 shows the illuminance on a surface for the same LED with a lens as illustrated. The light is more narrowly focused into a smaller area having a radius of about 6 meters. Because area is related to the square of the radius, the light from the lens element 16A is redirected or focused over an area that is less than 20% or less than 10% of the area illuminated by the same LED alone without a lens. In addition to narrowly focusing the light, lens element 16A also reshapes the light distribution, so that the illuminance along the surface generally decreases linearly with distance from the center line of the LED. This allows LEDs 12 and corresponding lens elements 16A to be arranged in abutting arrays that provide uniform illuminance over the full extent of an array.

Figure 10:
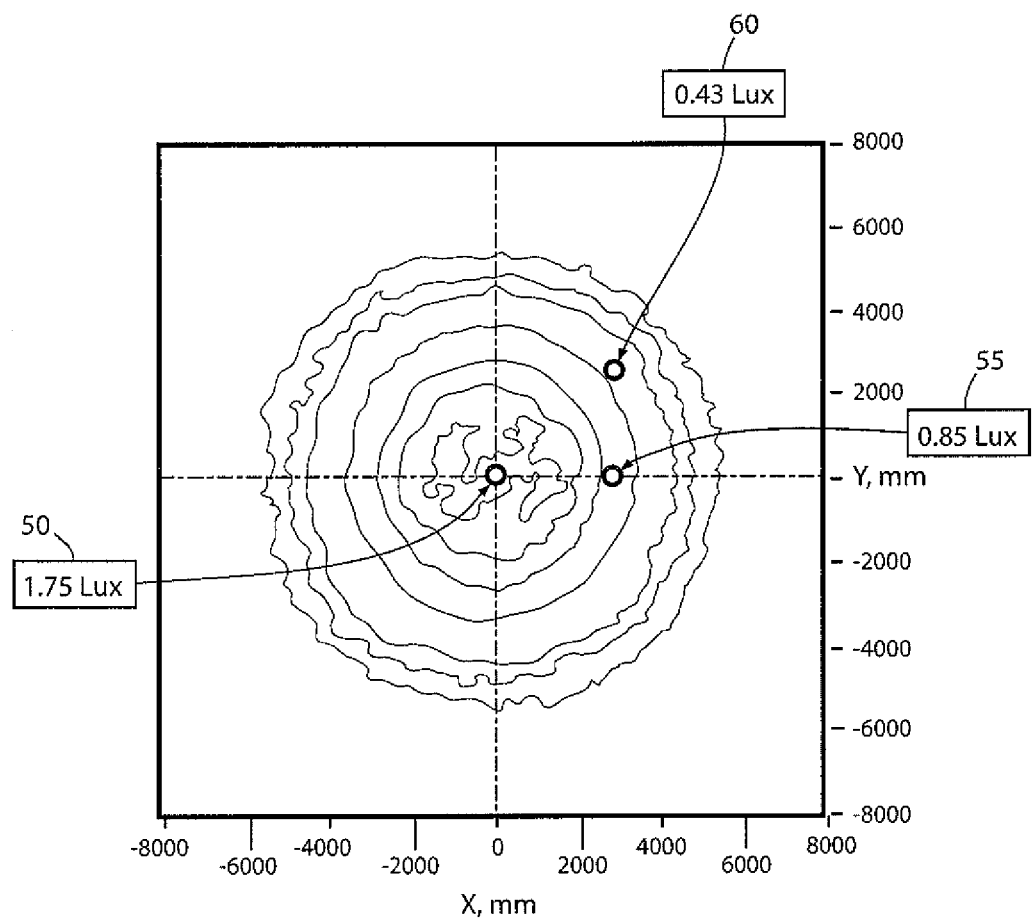
FIG. 10 is a graphical representation of illuminance over an area parallel to a generally planar lens element and perpendicular to the general direction in which light is propagated from an LED through the lens element.

FIG. 10 is a graphical illustration of the illuminance over an area parallel to a generally planar lens element of an assembly comprising an LED positioned adjacent the lens element. The light from the LED is distributed over the surface such that the maximum luminous flux (e.g., 1.75 lux) is at a center point 50 of the area. At side points 55, an approximately equal distance (e.g., about 3000 mm) in each of four different directions spaced 90° apart, the luminous flux is approximately 50% of the maximum luminous flux (e.g., about 0.85 lux). At four corner points 60 of a square having sides defined by lines passing through the side points, with the side points centered on the sides of the square, the luminous flux is 25% of the maximum luminous flux (e.g., about 0.43 lux). As a result, a plurality of pairs of identical LEDs and lens elements can be arranged in an array in which the sides of adjacent lens elements meet (i.e., abut or approximately coincide), and in which the corners of four mutually adjacent lens elements meet. This arrangement allows expanded lighting patterns to be assembled such that the illuminance is uniformly distributed over the entire area illuminated by a composite luminaire having a plurality of LEDs and a plurality of corresponding lens elements.

By providing ridges 20 that comprise facets that direct light in both a direction away from a center of each of the generally planar lens elements 16A and a direction toward the center of each of the generally planar lens elements, light can be spread more effectively to build a beam pattern that has the effect of appearing to be uniformly lit over the entire area of the lens member 16 from all viewing angles, eliminating the "spotted" look that is typical of many LED luminaires.

By using a combination of concentric ridges having rounded corners and configured to provide Fresnel facets, a beam pattern that performs as a square interior down light is created.

What is claimed is:

1. A light emitting diode luminaire, comprising:
   an array of light emitting diodes mounted on a circuit board; and
   a generally planar lens element positioned adjacent a corresponding one of each of the light emitting diodes, each generally planar lens element having a plurality of concentric ridges circumscribing a top center of the generally planar lens element and projecting from a surface of the generally planar member to define facets for redirecting light emitted from the corresponding light emitting diode, wherein at least one of the concentric ridges includes a first concave facet facing toward a top center of the generally planar lens element, a second concave facet facing away from the top center of the generally planar lens element, and a third concave facet extending between an upper end of the first facet and an upper end of the second facet.

2. A light emitting diode luminaire, comprising:
   an array of light emitting diodes mounted on a circuit board; and
   a generally planar lens element positioned adjacent a corresponding one of each of the light emitting diodes, each generally planar lens element having a plurality of concentric ridges circumscribing a top center of the generally planar lens element and projecting from a surface of the generally planar member to define facets for redirecting light emitted from the corresponding light emitting diode, wherein at least two adjacent concentric ridges have a generally square shape defined by straight sides and rounded corners.

3. The luminaire of claim 1, in which the generally planar lens elements are positioned with a top center of the generally planar lens element less than 5 mm from the corresponding light emitting diode.

4. The luminaire of claim 1, in which each of the plurality of concentric ridges has a height that is less than 0.5 mm.

5. A light emitting diode luminaire, comprising:
   an array of light emitting diodes mounted on a circuit board; and
   a generally planar lens element positioned adjacent a corresponding one of each of the light emitting diodes, each generally planar lens element having a plurality of concentric ridges circumscribing a top center of the generally planar lens element and projecting from a surface of the generally planar member to define facets for redirecting light emitted from the corresponding light emitting diode, wherein each lens concentrates light from a corresponding light emitting diode over an area that is less than 20% of an area illuminated by the light emitting diode alone without the lens element.

6. A light emitting diode luminaire, comprising:
   an array of light emitting diodes mounted on a circuit board; and a generally planar lens element positioned adjacent a corresponding one of each of the light emitting diodes, each generally planar lens element having a plurality of concentric ridges circumscribing a top center of the generally planar lens element and projecting from a surface of the generally planar member to define facets for redirecting light emitted from the corresponding light emitting diode, wherein light emitted from each light emitting diode and refracted at the corresponding lens element forms a generally square beam pattern on a surface normal to the generally planar surface of the lens, such that a maximum luminous flux is at the center of the square pattern, a luminous flux of about 50% of the maximum luminous flux is at each of four edge points a given distance along a straight line extending from the center toward each edge of the generally square pattern, and a luminous flux of about 25% of the maximum luminous flux is at each of four corners points that define the corners of a square having sides passing through the four edge points, whereby the lens elements and light emitting diodes of the luminaire can be arranged in arrays with adjacent edge and corner points aligned such that a composite beam pattern from a plurality of light emitting diodes and their corresponding lens elements has a light distribution over the area luminous flux from a single light emitting diode combined with a single lens element.

7. A light emitting diode luminaire, comprising:

an array of light emitting diodes mounted on a circuit board; and a generally planar lens element positioned adjacent a corresponding one of each of the light emitting diodes, each generally planar lens element having a plurality of concentric ridges circumscribing a top center of the generally planar lens element and projecting from a surface of the generally planar member to define facets for redirecting light emitted from the corresponding light emitting diode, wherein at least one of the concentric ridges comprises facets that direct light in both a direction away from a center of each of the generally planar lens elements and a direction toward the center of each of the generally planar lens elements.

8. The luminaire of claim 1 in which at least one of the concentric ridges defines a generally square shape having rounded corners, and at least one of the concentric ridges defines a generally circular shape.

\* \* \* \* \*